US008363717B2

(12) United States Patent
Togita et al.

(10) Patent No.: US 8,363,717 B2
(45) Date of Patent: Jan. 29, 2013

(54) IMAGE PROCESSING APPARATUS

(75) Inventors: Koji Togita, Fujisawa (JP); Daisuke Sakamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1416 days.

(21) Appl. No.: 11/409,313

(22) Filed: Apr. 24, 2006

(65) Prior Publication Data

US 2006/0262848 A1 Nov. 23, 2006

(30) Foreign Application Priority Data

May 17, 2005 (JP) ................................ 2005-144554
May 17, 2005 (JP) ................................ 2005-144555

(51) Int. Cl.
*H04N 7/12* (2006.01)
*H04N 11/02* (2006.01)
*H04N 11/04* (2006.01)

(52) U.S. Cl. ................................................. 375/240.03
(58) Field of Classification Search .............. 375/240.03
See application file for complete search history.

(56) References Cited

U.S. PATENT DOCUMENTS

| 5,650,860 | A | * | 7/1997 | Uz | 382/253 |
|---|---|---|---|---|---|
| 5,812,790 | A | * | 9/1998 | Randall | 709/247 |
| 6,535,251 | B1 | * | 3/2003 | Ribas-Corbera | 375/240.03 |
| 6,600,783 | B1 | | 7/2003 | Morita et al. | 375/240.03 |
| 6,600,872 | B1 | | 7/2003 | Yamamoto | 386/67 |
| 6,654,417 | B1 | * | 11/2003 | Hui | 375/240.03 |
| 6,823,008 | B2 | * | 11/2004 | Morel | 375/240.03 |
| 6,904,094 | B1 | * | 6/2005 | Liu et al. | 375/240.13 |
| 6,963,608 | B1 | * | 11/2005 | Wu | 375/240.03 |
| 7,675,970 | B2 | * | 3/2010 | Nemiroff et al. | 375/240.03 |
| 7,697,608 | B2 | * | 4/2010 | Lee | 375/240.03 |
| 2003/0067979 | A1 | | 4/2003 | Takahashi et al. | 375/240.03 |
| 2005/0276328 | A1 | | 12/2005 | Sakamoto | 375/240.16 |
| 2007/0189380 | A1 | * | 8/2007 | Goh et al. | 375/240.03 |

FOREIGN PATENT DOCUMENTS

| EP | 0 975 177 A | 1/2000 |
|---|---|---|
| JP | 07184195 A | 7/1995 |
| JP | 2001-025015 A | 1/2001 |
| JP | 2003-037844 | 2/2003 |
| JP | 2004-072143 | 3/2004 |
| WO | WO 97/32436 A | 9/1997 |

OTHER PUBLICATIONS

C.A. Gonzales, et al., "Motion Video Adaptive Quantization in the Transformation Domain", IEEE Transactions on Circuits and Systems for Video Technology, vol. 1, No. 4, pp. 374-378, Dec. 1, 1991.

* cited by examiner

*Primary Examiner* — Mehrdad Dastouri
*Assistant Examiner* — Jeremaiah C Hallenbeck-Huber
(74) *Attorney, Agent, or Firm* — Fitzpatrick, Cella, Harper & Scinto

(57) ABSTRACT

An image processing apparatus includes an encoding unit encoding an input motion image signal, a recording unit recording encoded motion image data on a recording medium, a complexity detection unit detecting complexity of a motion image according to the input motion image data, a remaining amount detection unit detecting a remaining recording capacity of the recording medium, and a control unit having a first mode for controlling the encoding unit based on information of the complexity detected by the complexity detection unit so as to adjust a code amount of the encoded motion image data and a second mode for controlling the encoding unit without using the information of the complexity detected by the complexity detection unit so as to adjust the code amount of the encoded motion image data, wherein the control unit switches over the first mode and the second mode on the basis of an output of the remaining amount detection unit.

7 Claims, 6 Drawing Sheets

IMAGE PROCESSING APPARATUS

BACKGROUND OF THE INVENTION

1. Field of the Invention

The present invention relates to an image processing apparatus, and more particularly to an apparatus encoding an image signal.

2. Description of Related Art

Conventionally, as a technique of encoding motion image data to compress an information amount, the MPEG system is known. The MPEG system is an encoding system combining intra-frame encoding, which performs encoding only using the image data in a single frame, and inter-frame prediction encoding, which encodes a difference (prediction error) with a reference frame. In the inter-frame prediction encoding, the image data in one frame is divided into blocks, each including a predetermined number of pixels, and a block which has the minimum difference with the image data of the reference frame is detected among the blocks. Then, a motion vector to the reference block is obtained, and the motion vector is encoded together with the difference data.

The level distributions of the generated signals of prediction residuals in the prediction encoding and of orthogonal transform coefficients in transform encoding have considerable deviations. Accordingly, by assigning codes having different lengths according to the occurrence frequencies of signal levels, the average value of data amounts can be made shorter than the data amounts of fixed length codes. The method of transforming codes to those having different lengths according to the occurrence frequencies of data is called as variable length encoding. In case of using the variable length encoding, the larger the deviation of the occurrence frequency of data is, the smaller the whole data amount becomes. In this manner, the use of variable length codes enables the reduction of average data amount in comparison with that of the fixed length encoding while the quality of the reproduced signals are kept to be equal.

Because the code amount of each scene is different from each other in the MPEG encoding, the transfer rates of the encoded data are not constant. Consequently, it becomes a problem how to control the data rates of image data when the image data encoded by the MPEG encoding is recorded on a storage medium having a limitation of its recording rate such as a magnetic tape, an optical disc or the like.

As a control method of a data rate, there is a method called as a group of picture (GOP) method, which controls the code amount of one GOP to be constant on a unit basis of the predetermined number of frames.

To put it concretely, in the MPEG encoding, the image data for one frame is divided into blocks, each referred to as a macro block and including a predetermined number of pixels, and motion compensation prediction, orthogonal transform and quantization are performed on every macro block. And by controlling quantization steps used in quantization processing, the code amounts of each GOP can be controlled to be substantially constant (see, for example, Japanese Patent Application Laid-Open No. H07-184195).

Moreover, in Test Model 5 (TM 5) of MPEG 2, it is also taken in consideration to adjust the code amount to be assigned to each block in a pictures, by using the factor called as the complexity of an image. The complexity is also called as activity, and is a factor indicating a feature of an input image. In this manner, devices for obtaining a reproduced image of a high image quality corresponding to the feature of the image within a limited code amount have been performed (see, for example, Japanese Patent Application Laid-Open No. 2003-37843 corresponding to U.S. patent Published application No. 2003/0067979).

In recent years, a DVD recorder, a HDD recorder, a disk video camera and the like have appeared as a household apparatus for recording the image data subjected to MPEG encoding in this manner. Many apparatus of this kind are equipped with a plurality of modes (image quality modes) having different target data rates of image data to efficiently use limited recording capacities. That is, when a target rate is set to be high, while an image having a high image quality can be recorded, a large storage capacity becomes necessary, and a recordable time becomes short. Moreover, when the target rate is set to be low, the recordable time becomes long, but the image quality of a recorded image becomes low.

The related art described above performs encoding using the information of complexity regardless of the data rate of encoded image data.

And, as described above, when the target data rate of image data to be recorded is set to be low, the assignment of a code amount according to the complexity (visual characteristic) is performed under a condition in which an assigned code amount per frame is small.

The information of the complexity acts, as a disturbance, on the configuration performing code amount control on the basis of a generated code amount.

Consequently, when a target data rate is low, there is a case where the image quality becomes deteriorated on the contrary in comparison with that of an image encoded without using the complexity, such as a case where block noises are conspicuous and the like.

Moreover, in the above TM 5 of MPEG 2, a device of preventing the deterioration of a flat portion of an image by assigning a relatively much code amount to a block having little complexity is performed.

However, because the related art performs encoding using the information of complexity regardless of the data rate of encoded image data, the related art has a problem in which a generated code amount exceeds the number of bits assigned to a frame when there are many macro blocks having small values of complexity.

For example, it is necessary for a disk video camera to certify the recordable time of a recording medium within an error range.

However, there is a problem that the recordable time cannot be certified when the generated code amount changes in this manner.

SUMMARY OF THE INVENTION

It is an object of the present invention to settle the problems described above.

Moreover, it is another object of the present invention to provide an image processing apparatus capable of guaranteeing a recording time necessary for a recording medium by performing code amount control certainly.

In order to attain such objects, according to one scope of the present invention, an image processing apparatus comprises: encoding means for encoding an input motion image signal to generate encoded motion image data; recording means for recording the encoded motion image data on a recording medium; complexity detection means for detecting complexity of a motion image according to the input motion image data; remaining amount detection means for detecting a record remaining capacity of the recording medium; and control means having a first mode for controlling the encoding means based on information of the complexity detected by the complexity detection means so as to adjust a code amount of the encoded motion image data output from the encoding means, and a second mode for controlling the encoding means without using the information of the complexity detected by the complexity detection means so as to adjust the code amount of the encoded motion image data output from the encoding means; wherein the control means switches-over the first mode and the second mode on the basis of an output of the remaining amount detection means.

Other objects and features of the present invention will become clear from the following embodiments and the description of the attached drawings.

DESCRIPTION OF THE PREFERRED EMBODIMENTS

First Embodiment

In the following, a suitable embodiment of an image processing apparatus according to the present invention is described in detail with reference to FIG. 1.

Figure 1:
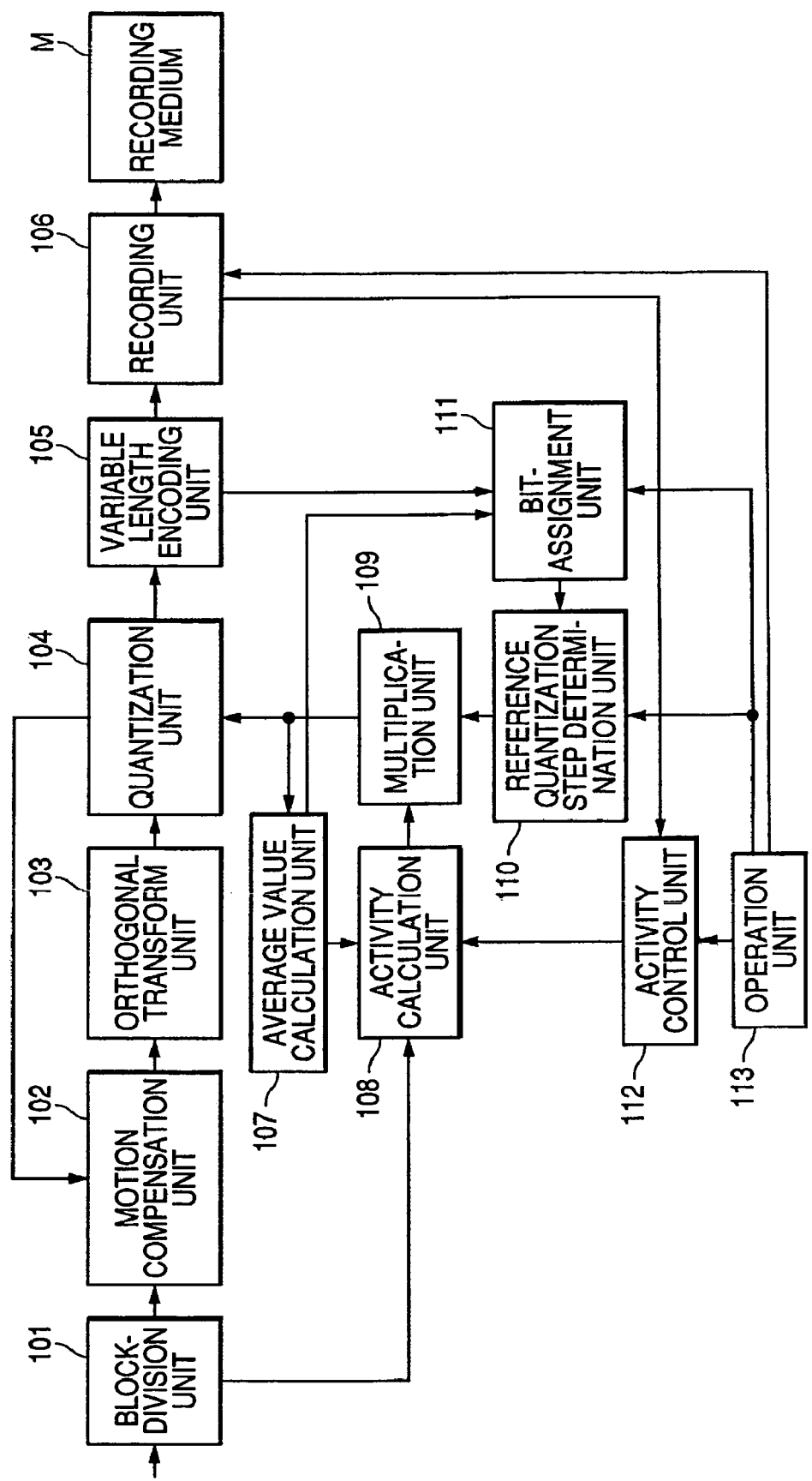
FIG. 1 is a diagram showing the configuration of a recording apparatus as a first embodiment of the present invention.

FIG. 1 is a block diagram of the recording apparatus according to the present invention.

As shown in FIG. 1, the recording apparatus is composed of a block-division unit 101, a motion compensation unit 102, an orthogonal transform unit 103, a quantization unit 104, a variable length encoding unit 105, a recording unit 106, an average value calculation unit 107, an activity calculation unit 108, a multiplication unit 109, a reference quantization step determination unit 110, a bit-assignment unit 111 and an activity control unit 112.

The block-division unit 101 divides each frame of input motion image data into macro blocks, each composed of 16 pixels in horizontal direction×16 pixels in vertical direction. And the block-division unit 101 outputs the image data of the macro blocks (hereinafter referred to as MB data) to the motion compensation unit 102 and the activity calculation unit 108.

The motion compensation unit 102 includes an inverse quantization unit, an inverse orthogonal transform unit and a motion compensation unit, all not shown. And when an encoding object frame is an intra-frame encoding frame, the motion compensation unit 102 outputs input MB data to the orthogonal transform unit 103 as it is. Moreover, when the encoding object frame is an inter-frame encoding frame, the motion compensation unit 102 performs the well-known procedure to obtain prediction error data between the MB data of the present frame, which has been input from the block-division unit 101, and the image data of a reference frame to output the obtained prediction error data to the orthogonal transform unit 103.

The orthogonal transform unit 103 performs the DCT processing of the MB data or the prediction error data from the motion compensation unit 102 to convert the data into transform coefficients, and outputs the transform coefficients to the quantization unit 104.

The quantization unit 104 quantizes the input transform coefficients on the basis of the quantization step obtained from the multiplication unit 109. The values which the transform coefficients can take (hereinafter referred to as the number of levels) are controlled based on the quantization step. That is, when the quantization step is large, the number of levels decreases, and thereby the number of 0's increases and significant coefficients other than 0 decrease. Consequently, the encoded data amount after the variable length encoding also decreases.

Moreover, when the quantization step is small, the number of 0's decreases and the significant coefficients therefore increase. Consequently, the encoded data amount after the variable length encoding also increases.

Because the encoded data amount can be controlled by adjusting the quantization step in this manner, the data rate of the encoded data output from the variable length encoding unit 105 can be controlled. The transform coefficients quantized by the quantization unit 104 are output to the variable length encoding unit 105 and to the motion compensation unit 102.

The variable length encoding unit 105 performs the variable length encoding of the transform coefficient quantized by the quantization unit 104, and outputs the encoded transform coefficient (hereinafter referred to as encoded data) to the recording unit 106. The recording unit 106 has a not shown buffer memory, and stores the encoded data once in the buffer memory. After that, the recording unit 106 reads the encoded data at suitable timing to record the encoded data onto a recording medium M.

An operation unit 113 includes a recording switch, a stop switch and the like, and a user can operates the recording switch to instruct a start of recording. Moreover, the user can operate the stop switch to instruct a stop of recording.

When recording is started, the activity control unit 112 calculates the remaining recording capacity w of the recording medium M, and the total recording time t of the image data recorded on the recording medium M. Then, the activity control unit 112 generates a flag for adjusting the activity detected by the activity calculation unit 108 using the remaining recording capacity w and a plurality of threshold values set beforehand.

In the present embodiment, threshold values Th1 and Th2 (provided Th1>Th2) are obtained as follows.

$$Th1 = WTh1 \times t, Th2 = WTh2 \times t$$

Here, WTh1 and WTh2 denote previously-set reference values, and WTh1>WTh2. Consequently, Th1>Th2.

Then, the remaining recording capacity w is compared with these threshold values Th1 and Th2, and it is detected which state of the following three states is satisfied. And two flags, flag 1 and flag 2, are set according to each state.

$$w < Th2 \qquad \text{(i)}$$

$$Th2 < w < Th1 \qquad \text{(ii)}$$

$$Th1 < w \qquad \text{(iii)}$$

In case of the state (i) as a comparison result, the activity control unit 112 judges that the remaining recording capacity runs short, and sets the flag 2 to on to output the flag 2 to the activity calculation unit 108. Moreover, when the condition (i) is not satisfied, the flag 2 is made to be off.

Moreover, in case of (ii), it is judged that the remaining recording capacity has run short, and then a flag 1 is turned on and is output to the activity calculation unit 108. Moreover, when the condition is not satisfied, the flag 1 is made to be off.

In case of (iii), it is judged that the remaining recording capacity of the recording medium M has a sufficient surplus, and nothing is performed to the activity calculation unit 108. Although the number of threshold values is set as two in the present embodiment, the judgment of the remaining recording capacity of the recording medium can be also changed stepwise by increasing the number of the threshold values.

The activity calculation unit 108 obtains an activity from each macro block unit. The activity at a jth macro block $act_j$ is obtained in accordance with the following formula.

$$act_j = 1 + \min(var_{i,j}) \quad (1)$$

Here, $var_{i,j}$ is a dispersion value of the pixel values in an ith sub-block when the jth macro block is divided into four blocks. In the present embodiment, a macro block is composed of 16 pixels×16 pixels, and a sub-block is composed of 8 pixels×8 pixels. The number of pixels of each sub-block is 64, and the dispersion value is obtained every 64 pixels.

In addition, in the activity calculation unit 108, the activity may be calculated using the dynamic range of pixel values instead of the dispersion value of pixel values. The activity calculation unit 108 transforms the activity obtained in this manner to the normalized activity $Nact_j$ as the following formula using an average value of quantization steps obtained by the average value calculation unit 107.

$$Nact_j = (m \times act_j + avg) / (act_j + m \times avg) \quad (2)$$

Here, avg denotes the average value of the quantization steps obtained by the average value calculation unit 107, and m denotes an arbitrary natural number. It is provided that a given initial value is set as the average value avg at an early stage of encoding.

For example, when a flat part is included in a macro block, the activity of the macro block becomes small. When an edge is included in the flat part, the activity becomes large. Moreover, when an activity is output to the multiplication unit 109, the activity is normalized based on the average value of the quantization steps of the preceding frame output from the average value calculation unit 107, and the normalized activity is output. Then, the multiplication unit 109 corrects the reference quantization step obtained by the reference quantization step determination unit 110 based on the normalized activity to determine the quantization step.

Moreover, in the present embodiment, the calculation result of an activity is changed based on the state of the activity control flag output from the activity control unit 112.

The activity calculation unit 108 transforms $Nact_j$ into $Nact'_j$ in accordance with the states of the activity flag 1 and the activity flag 2 like the following formula, and outputs the transformed $Nact'_j$ to the multiplication unit 109.

When the flag 1 is on, $$Nact'_j = Nact_j + dec \text{ (at } Nact_j + dec < 1.0)$$

$$Nact'_j = 1.0 \text{ (at } Nact_j + dec \geq 1.0 \text{ and } Nact_j < 1.0).$$

When the flag 2 is on, $$Nact'_j = 1.0 \text{ (provided at } Nact_j < 1.0).$$

Here, dec denotes a constant of $0.1 \leq dec \leq 1.0$.

First, when the flag 2 is on, it is judged that the remaining recording capacity of the recording medium M is left very little. Accordingly, in order to remove the influences of the activity to data rate control, when $Nact_j$ is smaller than 1.0, $Nact_j$ is set to 1.0, and it is output to the multiplication unit 109. However, when $Nact_j$ is 1.0 or more, it is output as it is. Alternatively, the value 1.0 may be set to be always output without performing the calculation of $Nact_j$.

On the other hand, when the flag 1 is on, it is judged that the remaining recording capacity of the recording medium M has run short. Accordingly, in order to make the influence by the activity to data rate control small, when the normalized activity $Nact_j$ is smaller than 1.0, $Nact'_j$, to which the correction value dec is added, is output to the multiplication unit 109. In addition, although the threshold values for distinguishing the remaining recording capacity of the recording medium M are set as two values in the present embodiment, the judgment of the remaining recording capacity can be also changed stepwise by increasing the number of the threshold values. At that time, the dec may be stepwise changed according to the remaining recording capacity.

The multiplication unit 109 multiplies the reference quantization step output from the reference quantization step determination unit 110 by the normalized activity $Nact_j$ or $Nact'_j$, both output from the activity calculation unit 108, to adjust the quantization step. And the quantization step is output to the quantization unit 104 while the quantization step is also output to the average value calculation unit 107.

The average value calculation unit 107 calculates the average value of the quantization steps for one frame, and outputs the quantization step to bit-assignment unit 111 while the average value calculation unit 107 also outputs the quantization step to the activity calculation unit 108.

The bit-assignment unit 111 determines the code amount (the number of bits) to be assigned to a frame which is intended to be coded after this, on the basis of the code amount generated up to the preceding frame by the variable length encoding unit 105 and the target data rate.

The reference quantization step determination unit 110 determines reference quantization steps $qI_j$, $qP_j$, and $qB_j$ to each macro block on the basis of the number of the code amounts generated up to the preceding macro block and the assigned code amount. Here, j indicates a macro block number, and I, P and B indicates the type of a picture.

For example, in case of obtaining $qI_j$, first the buffer fullness $dI_j$ in the jth block of an I picture is obtained by the following formula.

$$dI_j = dI_0 + B_{j-1} - (Ti(j-1))/MB_{cnt}$$

And the reference quantization step $qI_j$ is obtained by the following formula on the basis of the $dI_j$.

$$qI_j = 31 dI_j / r$$

Here, $dI_0$ denotes the buffer fullness at an initial stage, which is the last buffer fullness $dIMB_{cnt}$ when the last I picture has been encoded. It is provided that an initial value is an arbitrary constant. Moreover, $B_j$ denotes the total number of the bits in the image generated up to the jth block, $MB_{cnt}$ denotes the total number of the macro blocks in the image, and r denotes a reaction parameter.

The above formula reflects the difference between the assigned number of bits generated up to the preceding macro block and the number of bits actually generated when Ti bits are uniformly assigned to each macro-bit on virtual buffer fullness.

Consequently, according to the above formula, when the number of bits generated in the preceding macro block is large, the virtual buffer fullness becomes large, and thereby the reference quantization step becomes large. As a result, the reference quantization step determination unit 110 works so as to reduce the numbers of the generated bits of the subsequent frames.

On the other hand, when the number of the generated bits of the preceding macro block is small, the virtual buffer fullness becomes small, and thereby the reference quantization step becomes small. As a result, the reference quantization step determination unit 110 works so as to enlarge the number of the generated bits of the subsequent frames. In addition, the similar method is used also in the P picture and the B picture to determine the reference quantization steps.

Figure 2:
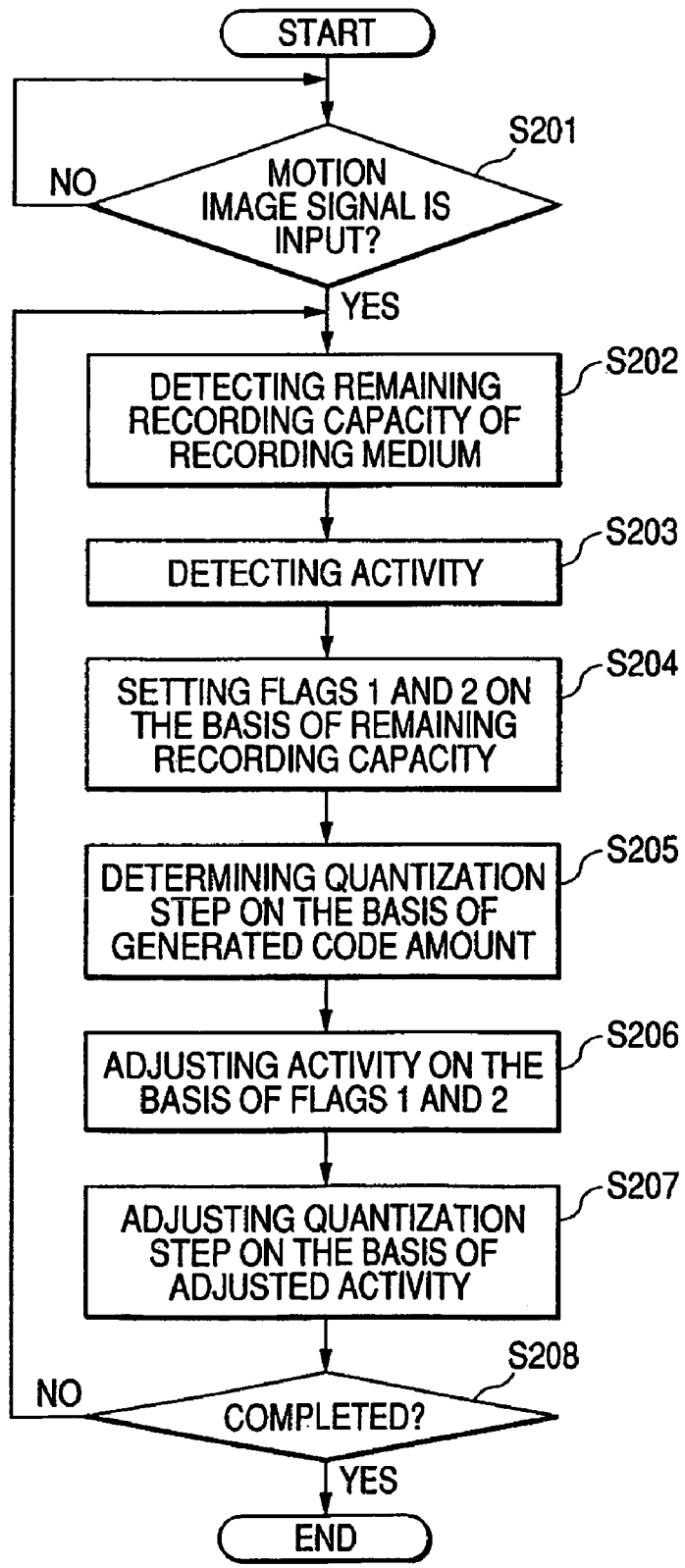
FIG. 2 is a flowchart showing the setting processing of a quantization step in the first embodiment.

Next, the determination processing of a quantization step by the image processing apparatus of the present embodiment is described with reference to the flowchart of FIG. 2.

At Step S201, it is judged whether a motion image signal is input or not. As a result of the judgment, when a motion image signal is input, the recording capacity of the recording medium M is detected. Next, at Step S203, the activity calculation unit 108 detects the activity Nact of each macro block of the input motion image signal.

Next, the processing progresses to Step S204, and the activity control unit 112 sets the activity control flags 1 and 2 on the basis of the remaining recording capacity. And at Step S205, the reference quantization step determination unit 110 determines reference quantization step. Next, the processing progresses to Step S206, and the activity calculation unit 108 changes the activity Nact on the basis of the states of the flags 1 and 2 to send the changed activity Nact to the multiplication unit 109. And at Step S207, the multiplication unit 109 multiplies the reference quantization step from the reference quantization step determination unit 110 by the activity from the activity calculation unit 108 to adjust the value of the multiplied reference quantization step, and the multiplication unit 109 sends the adjusted reference quantization step to the quantization unit 104.

After that, at Step S208, it is judged whether the input of the motion image data stops and all processing has been completed or not. When a motion image signal is successively input, the processing returns to Step S202.

As described above, according to the present embodiment, when the remaining recording capacity of a recording medium is little, a quantization step is determined without using activity. Consequently, when the remaining recording capacity is little left, the influence of the activity given to data rate control as a disturbance can be removed.

Consequently, it becomes possible to surely perform the code amount control on the basis of a generated code amount, and to certify the recording time obtained in the recording medium.

Second Embodiment

Next a second embodiment is described. However, although the image encoding apparatus according to the second embodiment has the construction similar to one shown in FIG. 1, the image encoding apparatus of the second embodiment is made to allow a user to arbitrarily set a target data rate (image quality) of a motion image signal with the operation unit 113.

That is, the present embodiment is configured to be equipped with three image quality modes of a high image quality mode, a standard mode and a long time mode. The user can arbitrarily select any one of these three image quality modes. And the target data rate of the high image quality mode is the highest, and the target data rates of the standard t mode and the long time mode become lower in this order after that.

When recording is started, the activity control unit 112 calculates the remaining recording capacity w of the recording medium M, and the recording time up to now. Then, the activity control unit 112 generates a flag for adjusting the activity detected by the activity calculation unit 108 on the basis of the remaining recording capacity w and the information mode of the image quality mode set by the operation unit 113.

In the present embodiment, the case where there are the following three kinds of modes as recording modes mode is described:

high image quality mode: mode=high
standard mode: mode=mid
long time mode: mode=low First, predetermined reference values $w_{high}$, $w_{mid}$ and $w_{low}$ in each mode are set so that they satisfy $w_{high} > w_{mid} > w_{low}$, and threshold values are set to be $Th_{high} = w_{high} \times t$, $Th_{mid} = w_{mid} \times t$, and $Th_{low} = w_{low} \times t$.

As described above, the average data rates (target data rates) changes according to the record modes mode.

For example, at the time of mode=high, compared with mode=mid and mode=low, the average bit rate becomes larger, and the capacity of a recording medium more rapidly becomes less. Accordingly, the value of a threshold value is changed according to a mode.

After setting the threshold values to be references in accordance with the recording modes, the processing similar to that in the first embodiment is executed. When it is supposed that two threshold values are set to each mode as the first embodiment, the remaining recording capacity is compared with the threshold values in each mode to discriminate which state of the followings is satisfied, in the present embodiment.

When mode=high $w < Th_{high}2$ (i)

$Th_{high}2 < w < Th_{high}1$ (ii)

$Th_{high}1 < w$ (iii)

When mode=mid $w < Th_{mid}2$ (i)

$Th_{mid}2 < w < Th_{mid}1$ (ii)

$Th_{mid}1 < w$ (iii)

When mode low $w_{low} < Th2$ (i)

$Th_{low}2 < w < Th_{low}1$ (ii)

$Th_{low}1 < w$ (iii)

(Provided that $Th_{low}1 < Th_{mid}1 < Th_{high}1$, $Th_{low}2 < Th_{mid}2, Th_{high}2$)

And the states of the two control flags 1 and 2 are set similarly in the first embodiment on the basis of any one of the three states (i), (ii) and (iii) in each mode.

The activity calculation unit 108 changes the activity similarly in the first embodiment on the basis of the state of the flags 1 and 2 set in each mode, and sends the changed activity to the multiplication unit 109.

Moreover, the reference quantization step determination unit 110 calculates the reference quantization step according to the assigned number of bits from the bit-assignment unit 111, and sends the calculated reference quantization step to the multiplication unit 109. At this time, in the present embodiment, the bit-assignment unit 111 changes the assigned number of bits on the basis of the image quality mode set by the operation unit 113, i.e. the target data rate.

As described above, because the target data rate becomes high in the high image quality mode compared with that in the standard image quality mode, the assigned number of bits also becomes larger than that in the standard mode.

After that, like the first embodiment, the multiplication unit 109 multiplies the quantization step from the reference quantization step determination unit 110 by the activity from the activity calculation unit 108, and sends the multiplied quantization step to the quantization unit 104.

As described above, according to the present embodiment, when the remaining recording capacity of a recording medium is little, the quantization step is determined without using the activity. Consequently, when the remaining recording capacity runs short, the influence of the activity given to data rate control as a disturbance can be removed.

Moreover, because the threshold value for distinguishing the state of the remaining recording capacity is changed according to the image quality mode, it becomes possible to change the control state of the quantization step using the activity to the optimal state according to the image quality mode.

In addition, although three image quality modes are set in the present embodiment, the number of the modes may be increased to more stepwise perform the activity control according to the image quality. Moreover, the number of the modes may be reduced conversely to decrease the number of steps of the activity control according to the image quality.

Third Embodiment

Next a third embodiment is described.

In the above first and the second embodiments, when there was little remaining recording capacity of a recording medium, the quantization step is determined without using the activity.

In the present embodiment, according to the image quality mode (target data rate), it is controlled whether the quantization step is determined using the activity or not.

Figure 3:
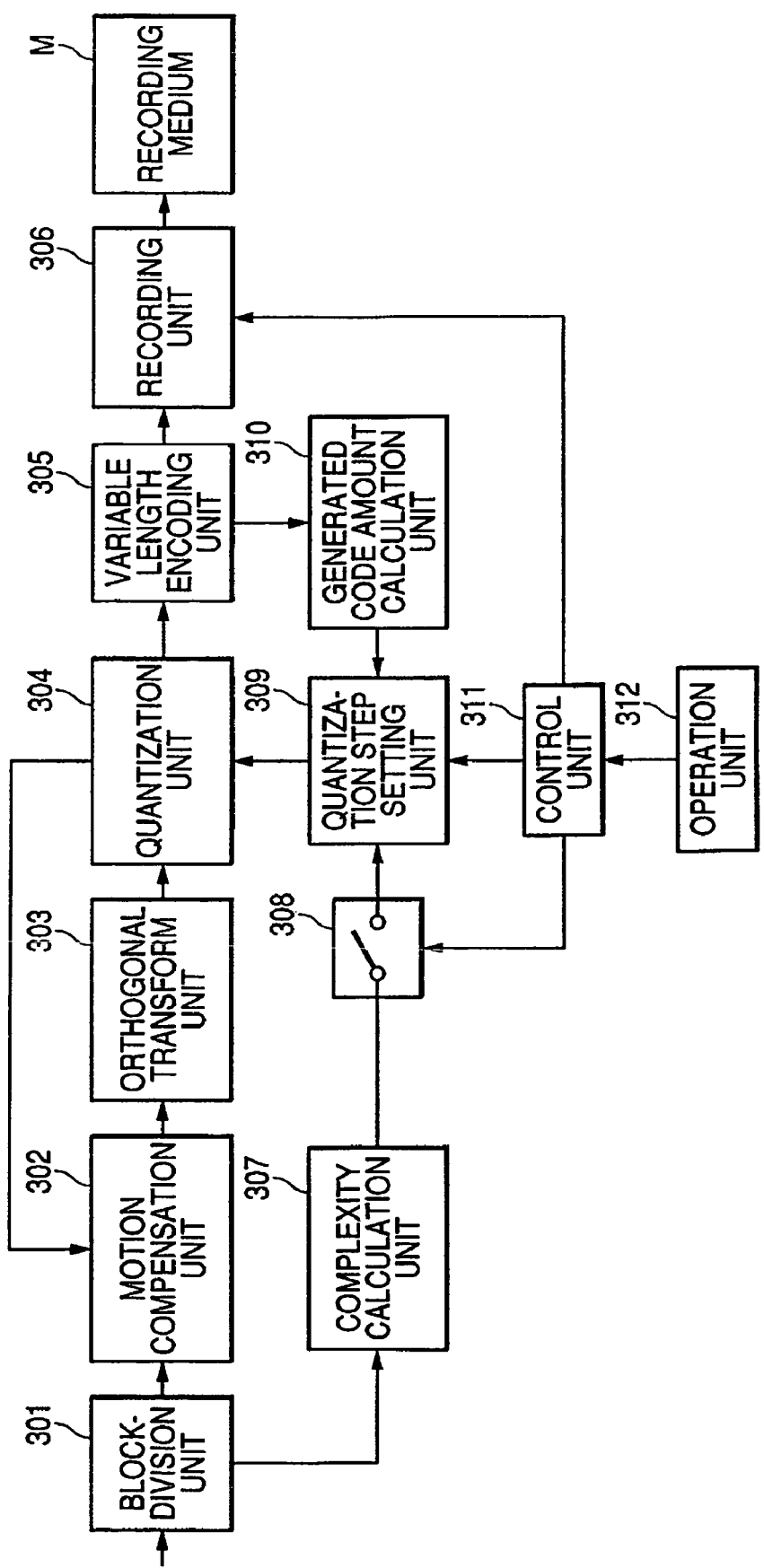
FIG. 3 is a diagram showing the configuration of a recording apparatus as a third embodiment of the present invention.

FIG. 3 is a diagram showing the configuration of a recording apparatus 300 according to the present embodiment.

As shown in FIG. 3, the recording apparatus 300 is composed of a block-division unit 301, a motion compensation unit 302, an orthogonal transform unit 303, a quantization unit 304, a variable length encoding unit 305, a recording unit 306, a complexity calculation unit 307, a switch 308, a quantization step setting unit 309, a generated code calculation unit 310 and an operation unit 312.

The block-division unit 301 divides each frame of input motion image data into macro blocks, each composed of 16 pixels in horizontal direction×16 pixels in vertical direction. And the block-division unit 301 outputs the image data of the macro blocks to the motion compensation unit 302 while the block-division unit 301 also outputs the image data to the complexity calculation unit 307.

When an encoding object frame is an intra-frame encoding frame, the motion compensation unit 302 outputs input MB data to the orthogonal transform unit 303 as it is. Moreover, when the encoding object frame is an inter-frame encoding frame, the motion compensation unit 302 performs a well-known procedure to obtain prediction error data between the MB data of the present frame, which has been input from the block-division unit 301, and the image data of a reference frame to output the obtained prediction error data to the orthogonal transform unit 303.

The orthogonal transform unit 303 performs the DCT processing of the MB data or the prediction error data from the motion compensation unit 302 to convert the data into transform coefficients, and outputs the transform coefficients to the quantization unit 304.

The quantization unit 304 quantizes the input transform coefficients based on the quantization step obtained from the quantization step setting unit 309. Because the encoded data amount can be controlled by adjusting the quantization step, it is possible to control the data rate of the encoded data output from the variable length encoding unit 305. The transform coefficients quantized by the quantization unit 304 are output to the variable length encoding unit 305 while the transform coefficients are also output to the motion compensation unit 302.

The variable length encoding unit 305 performs the variable length encoding of the transform coefficient quantized by the quantization unit 304, and outputs the encoded transform coefficient to the recording unit 306. The recording unit 306 has a not shown buffer memory, and once stores the encoded data in the buffer memory. After that, the recording unit 306 reads the encoded data at an appropriate timing to record the encoded data onto a recording medium M.

The complexity calculation unit 307 calculates the complexity (activity) of each macro block as will be described later, and outputs the calculated complexity to the switch 308. The switch 308 sends the complexity information from the complexity calculation unit 307 to the quantization step setting unit 309 in accordance with the image quality mode selected with the operation unit 312. The quantization step setting unit 309 sets the quantization step to each macro block on the basis of the image quality mode set with the operation unit 312, the generated code amount from the generated code amount calculation unit 310, and the complexity information supplied through the switch 308.

The operation unit 312 includes a recording switch, a stop switch, a setting switch of an image quality mode, and the like. A user can operate the recording switch to instruct a start of recording. Moreover, the user can operate the stop switch to instruct a stop of recording. In the present embodiment, there are two modes of a standard mode and a high image quality mode as image quality modes. Then, in the high image quality mode, the target data rate is set to be higher than that in the standard mode.

In the following, the setting processing of a quantization step in the present embodiment is described with reference to the flowchart of FIG. 4.

Figure 4:
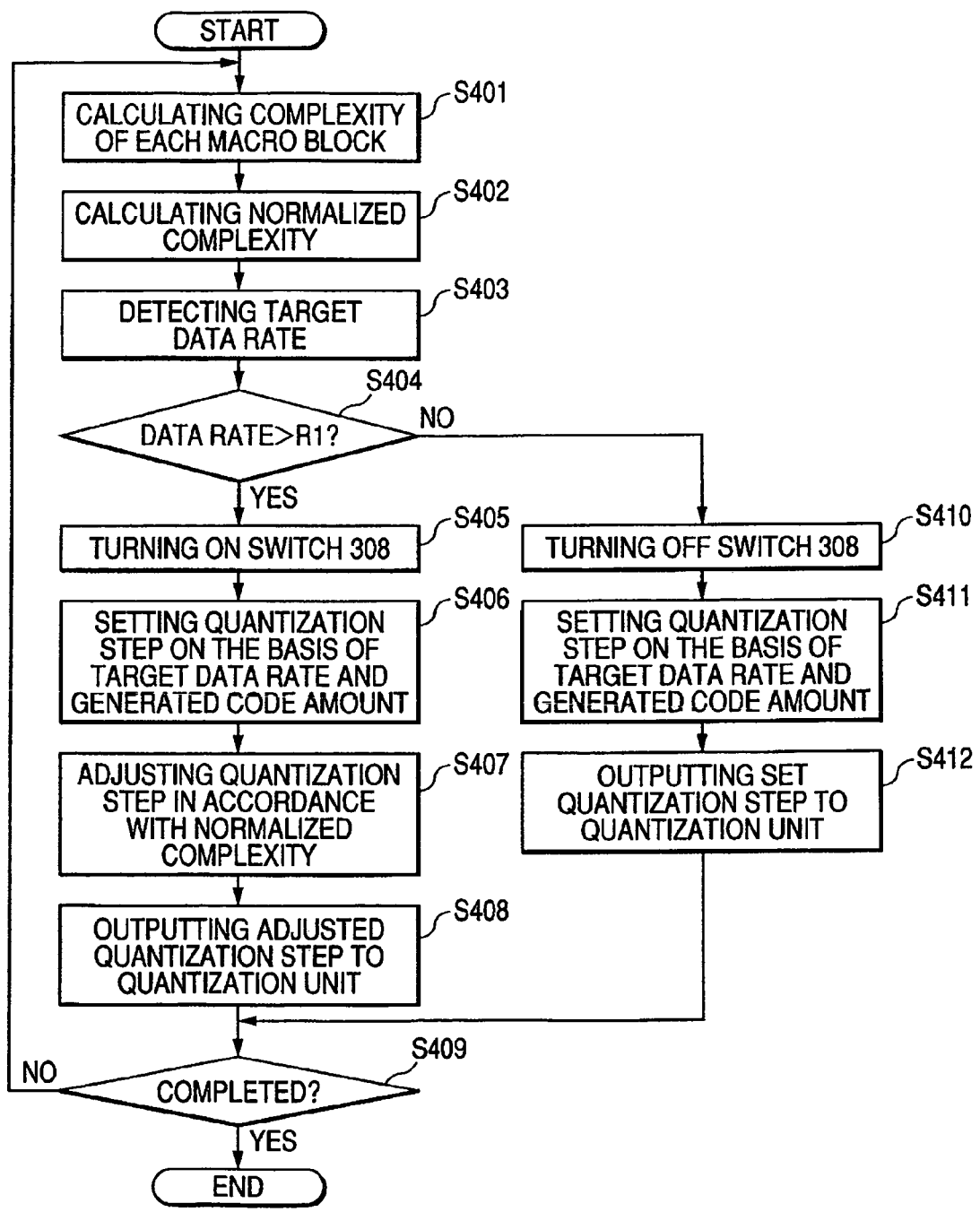
FIG. 4 is a flowchart showing the setting processing of a quantization step in the third embodiment.

The flow of FIG. 4 is executed every frame.

When recording is started, first, the complexity of each macro block of the present frame in input motion image data is calculated by the complexity calculation unit 307 (Step S401).

The complexity of each block is calculated in accordance with the above formula (1). Moreover, the dispersion value $var_{i,j}$ of a sub-block is calculated in accordance with the following formula.

$$var_{i,j} = \Sigma(Pk-P)^2/64$$

Moreover, normalized complexity information is calculated based on the calculated complexity by the complexity calculation unit 307 (Step S402). The normalized complexity is calculated in accordance with the above formula (2).

Moreover, a control unit 311 detects the present target data rate based on the image quality mode set by the operation unit 312 (Step S403). Next, the control unit 311 distinguishes whether the present target data rate is larger than a threshold value R1 or not (Step S404).

When the target data rate is larger than the threshold value R1, the control unit 311 turns on the switch 308 (Step S405).

And the control unit 311 controls the quantization step setting unit 309 to set a quantization step on the basis of the information of the generated code amount detected by the generated code amount calculation unit 310 and the target data rate (Step S406). And the control unit 311 adjusts the set quantization step on the basis of the normalized complexity information obtained by the complexity calculation unit 307 (Step S407). To put it concretely, the control unit 311 adjusts the quantization step by multiplying the set quantization step by the normalized complexity information. And the control unit 311 outputs the adjusted quantization step to the quantization unit 304 (Step S408).

On the other hand, when the target data rate is equal to or less than the threshold value R1 at Step S404, the control unit 311 turns off the switch 308 (Step S410). And the control unit 311 controls the quantization step setting unit 309 to set the quantization step on the basis of the information of the generated code amount detected by the generated code amount calculation unit 310 and the target data rate so that the encoded data rate may become equal to the target data rate (Step S411). And the control unit 311 outputs the quantization step to the quantization unit 304 (Step S412).

Then, when an instruction of recording stop is issued, the control unit 311 completes the processing (Step S409).

Thus, in the present embodiment, because, when the target data rate is higher than the threshold value, the quantization step is adjusted according to the complexity of an image to perform quantization, the image can be quantized using a visual characteristic.

Moreover, because, when the target data rate is lower than the threshold value, a quantization step is set without using the complexity information to perform the quantization, the deterioration of image quality such as the generation of block noises caused by the use of the complexity information can be prevented.

Fourth Embodiment

Next a fourth embodiment is described.

Figure 5:
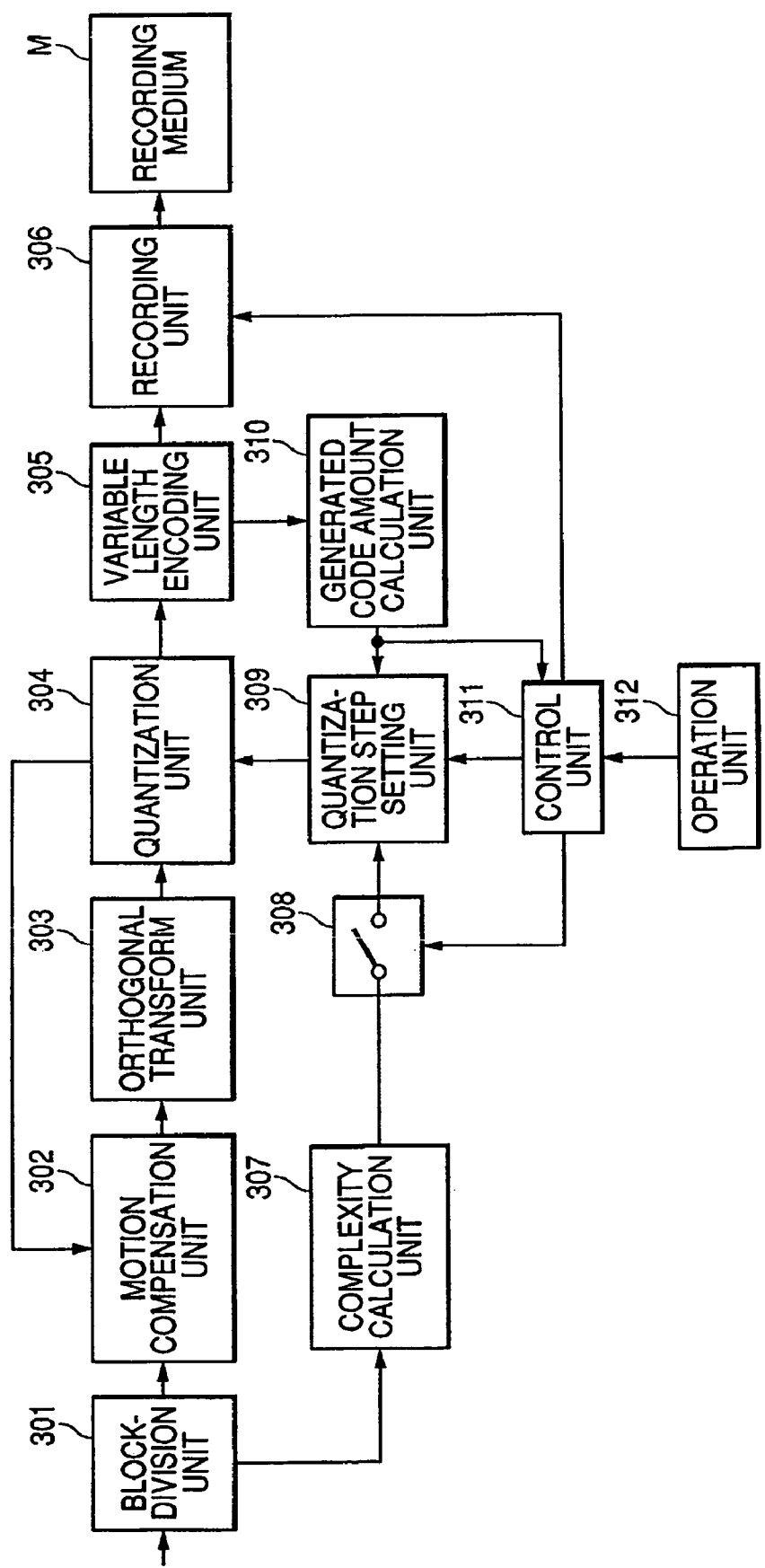
FIG. 5 is a diagram showing the configuration of a recording apparatus as a fourth embodiment of the present invention.

FIG. 5 is a diagram showing the configuration of a recording apparatus according to the fourth embodiment. The components similar to those of FIG. 3 are denoted by the same reference numerals as those in FIG. 3.

The apparatus shown in FIG. 5 encodes image data by a variable bit rate (VBR) system. Here, the variable bit rate system indicates a method of dynamically changing the code amount to be assigned to each scene in accordance with the complexity of the pattern of an image to be encoded.

To put it concretely, the method assigns more amounts of codes to a scene of a complicated pattern, and assigns fewer amounts of codes to an image of a relatively flat pattern. The present embodiment uses a well-known technique as the concrete variable bit rate system, and compares the code amount of the encoded image data generated just before with a predetermined value to perform encoding without using the complexity information when the code amount becomes lower than the predetermined value.

Figure 6:
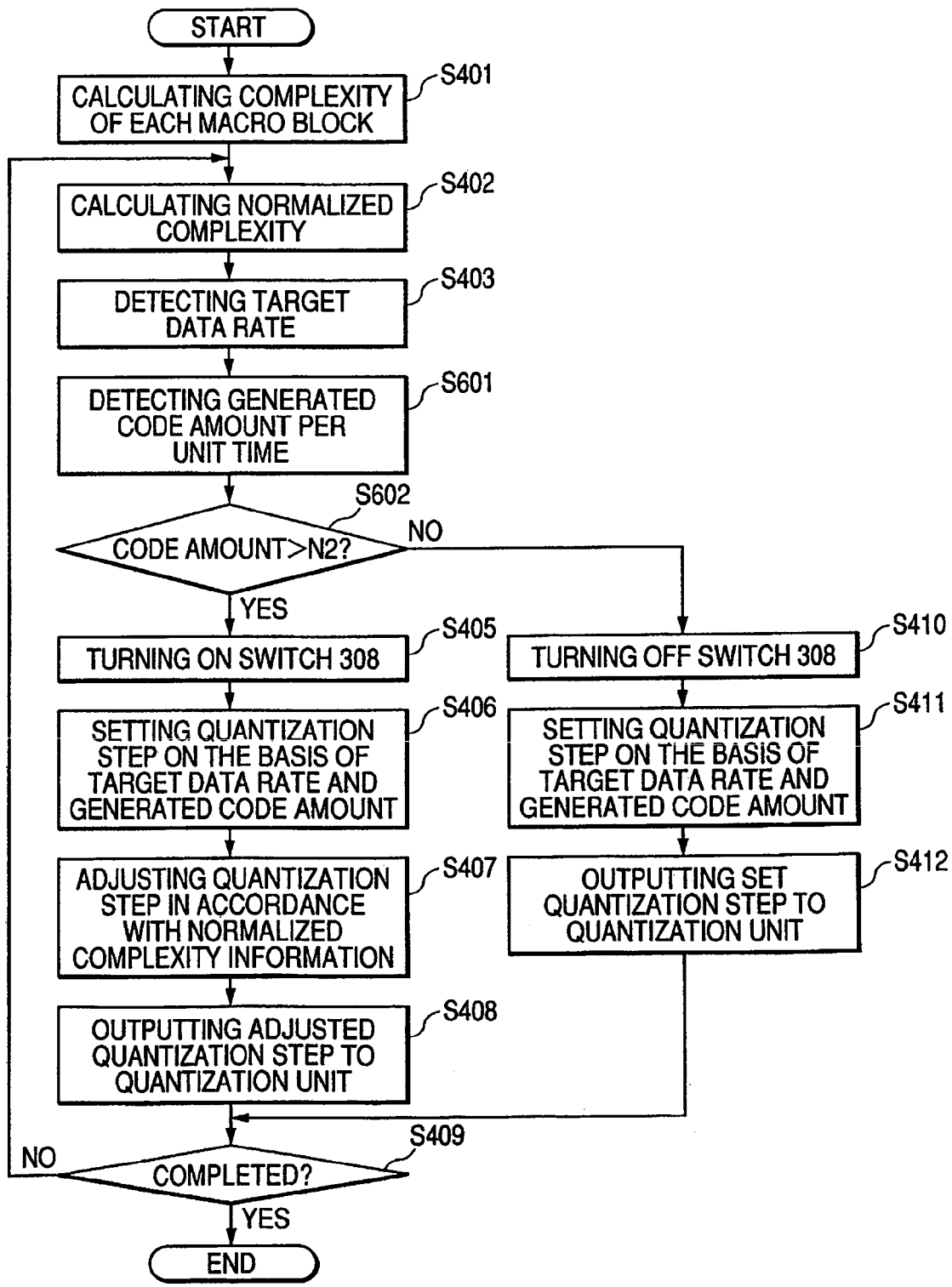
FIG. 6 is a flowchart showing the setting processing of a quantization step in the fourth embodiment.

Next, the setting processing of a quantization step in the present embodiment is described with reference to the flowchart of FIG. 6. In addition, the processing similar to that in the flow of FIG. 4 is denoted by the same reference numeral as the one in FIG. 4 in FIG. 6. Moreover, the flow of FIG. 6 is executed every frame.

When recording is started, the complexity of each macro block of one frame is calculated (Step S401). Next, normalized complexity is calculated (Step S402). In the present embodiment, the normalized complexity defined as the formula (2) is obtained based on the average of the complexity of each macro block and the complexity in the picture encoded just before.

Next, a target data rate is detected (Step S403), and the information of a generated code amount per unit time is detected by the generated code amount calculation unit 310 (Step S601). In the present embodiment, for example, the generated code amount per group of picture (GOP) is detected. Then, a quantization step is set based on the code amount per GOP. The GOP is a unit composed of the number of frames processed within a range of from an I picture to the next I picture, and is a basic unit of encoding in the MPEG system.

Next, the generated code amount per unit time is compared with a predetermined threshold value N2 to discriminate whether the generated code amount is larger than N2 or not (Step S602). Because the data rate is encoded while being dynamically changed in the VBR system, the generated code amount per GOP also significantly changes. At Step S602, it is possible to know whether the code amount generated per GOP is smaller than the predetermined code amount N2 or not in this manner.

When the generated code amount is larger than N2, the control unit 311 turns on the switch 308 (Step S405). Then the control unit 311 controls the quantization step setting unit 309 to set a quantization step on the basis of the information of the generated code amount detected by the generated code amount calculation unit 310 and the target data rate (Step S406). And the control unit 311 adjusts the set quantization step on the basis of the normalized complexity information obtained by the complexity calculation unit 307 (Step S407). To put it concretely, the control unit 311 adjusts the quantization step by multiplying the set quantization step by the normalized complexity information. And the control unit 311 outputs the adjusted quantization step to the quantization unit 304 (Step S408).

On the other hand, when the target data rate is equal to or less than the threshold value R1 at Step S404, the control unit 311 turns off the switch 308 (Step S410). And the control unit 311 controls the quantization step setting unit 309 to set the quantization step on the basis of the information of the generated code amount detected by the generated code amount calculation unit 310 and the target data rate (Step S411). And the control unit 311 outputs the quantization step to the quantization unit 304 (Step S412).

Then, when an instruction of recording stop is issued, the control unit 311 completes the processing (Step S409).

Thus, in the present embodiment, because, when the generated code amount per unit time is higher than the threshold value, the quantization step is adjusted according to the complexity of an image to perform quantization, the image can be quantized using a visual characteristic.

Moreover, because, when the generated code amount per unit time is lower than the threshold value, a quantization step is set without using the complexity information to perform the quantization, the deterioration of image quality such as the generation of block noises caused by the use of the complexity information can be prevented.

Other Embodiments According to the Present Invention

Each means and each step of the image processing methods which constitute the embodiments of the present invention can be realized by the operation of programs stored in a RAM, a ROM or the like of a computer. The programs and a recording medium which records the programs and can be read by a computer are included in the present invention.

Moreover, the present invention can be realized as the embodiments of a system, an apparatus, a method, a program, a storage medium and the like. To put it concretely, the present invention may be applied to a system composed of a plurality of pieces of equipment, or may be applied to an apparatus composed of one piece of equipment.

In addition, the present invention includes a case where a program of software realizing the functions of the embodiments described above (the programs corresponding to the flowcharts shown in FIGS. 2 and 4 in the embodiments) is directly or remotely supplied to a system or an apparatus and the functions are attained by the computer of the system or the apparatus which reads the supplied program to execute it.

Consequently, the program codes themselves which are installed in a computer in order to realize the functional processing of the present invention are also ones realizing the present invention. That is, the present invention includes the computer program itself for realizing the functional processing of the present invention.

In this case, as long as it has the function of a program, the program may be in a form of object U codes, a program executed by an interpreter, script data supplied to an OS or the like.

As a recording medium for supplying a program, there are, for example, a floppy disk (registered trademark), a hard disk, an optical disc, a magneto-optical disc, an MO, a CD-ROM, a CD-R, a CD-RW, a magnetic tape, a nonvolatile memory card, a ROM, a DVD (DVD-ROM, DVD-R) and the like.

In addition, as a program supplying method, a program can be also supplied by connecting with a homepage in the Internet using the browser of a client computer to download the computer program itself of the present invention or a compressed file including an automatic installing function to a recording medium such as a hard disk.

Moreover, the present invention can be also realized by dividing the program codes constituting the program of the present invention into a plurality of files to download the respective files from different home pages. That is, a WWW server which allows a plurality of users to download a program file for realizing the functional processing of the present invention with a computer is also included in the present invention.

Moreover, the realization of the present invention is also possible by encoding the program of the present invention to store the encoded program into a storage medium such as a CD-ROM and the like for distributing the program widely among users, and by allowing a user who clears a predetermined condition to download key information for deciphering the code from a home page through the Internet to use the key information for executing the encoded program to install the encoded program into a computer.

Moreover, in addition to the realization of the embodiments described above by executing a read program with a computer, the functions of the embodiments described above can be also realized by the execution of a part of or the whole actual processing by an OS operating on the computer based on the instructions of the program.

Moreover, the functions of the embodiments described above can be also realized by writing the program read from a recording medium into a feature expansion board inserted into a computer or a memory installed on a feature expansion unit connected to a computer before the execution of a part of or the whole actual processing by a CPU or the like provided on the feature expansion board or the feature expansion unit based on the instructions of the program.

This application claims priority from Japanese Patent Application Nos. 2005-144554 filed May 17, 2005 and 2005-144555 filed May 17, 2005, which are hereby incorporated by reference herein.

What is claimed is:

1. An image processing apparatus comprising at least one processor operable to function as:
an encoding unit configured to encode an input motion image signal to generate encoded motion image data;
a recording unit having a memory to store the encoded motion image data temporarily, said recording unit configured to record the encoded motion image data read from the memory on a recording medium;
a block-division unit configured to divide a frame of the input motion image signal into a plurality of blocks;
a complexity detection unit configured to detect complexity of an image corresponding to a block divided by said block-division unit;
a remaining amount detection unit configured to detect a remaining recording capacity of the recording medium; and
a control unit configured to control said encoding unit such that said encoding unit selectively performs a first quantization process for adjusting a code amount generated from the block divided by said block-division unit on the basis of information of the complexity detected by said complexity detection unit, and a second quantization process for adjusting the code amount generated from the block divided by said block-division unit without using the information of the complexity detected by said complexity detection unit,
wherein said control unit controls said encoding unit according to an output of said remaining amount detection unit, where the first quantization process is used for a first block in a frame, the second quantization process is used for a second block in said frame, and the first quantization process and the second quantization process are not used for the same block in the frame, and
wherein said control unit selects the first quantization process but not the second quantization process when the remaining recording capacity is larger than a predetermined threshold value, and selects the second quantization process but not the first quantization process when the remaining recording capacity is equal to or less than the predetermined threshold value.

2. An apparatus according to claim 1,
wherein said encoding unit includes a quantization unit quantizing the motion image data using a set quantization step and a variable length encoding unit performing variable length encoding of data output from said quantization unit,
wherein said control unit includes a quantization step setting unit setting the quantization step on the basis of the code amount generated from the block divided by said block-division unit and an adjustment unit adjusting the quantization step set by said quantization step setting unit on the basis of the information of the complexity, and
wherein said control unit outputs the quantization step adjusted by said adjustment unit to said quantization unit for the first quantization process, and outputs the quantization step set by said quantization step setting unit to said quantization unit for the second quantization process.

3. An apparatus according to claim 2, wherein said quantization step setting unit sets the quantization step so that a data rate of the encoded motion image data approaches a target data rate of the encoded motion image data, on the basis of the code amount generated from the block divided by said block-division unit and the target data rate.

4. An apparatus according to claim 3, further comprising a selection unit for selecting the target data rate from among a plurality of predetermined data rates,
   wherein for the first quantization process, said adjustment unit adjusts the quantization step according to the target data rate selected by said selection unit.

5. An apparatus according to claim 1, wherein one of the first quantization process and the second quantization process is selectively performed for the block according to a detected remaining recording capacity of the recording medium.

6. An image processing method comprising:
   an encoding step of encoding an input motion image signal to generate encoded motion image data;
   a recording step of recording the encoded motion image data on a recording medium;
   a block-division step of dividing a frame of the input motion image signal into a plurality of blocks;
   a complexity detection step of detecting complexity of an image corresponding to a block divided by said block-division unit;
   a remaining amount detection step of detecting a remaining recording capacity of the recording medium; and
   a control step of controlling the encoding step such that the encoding step selectively performs a first quantization process for adjusting a code amount generated from the block divided in said block-division step on the basis of information of the complexity detected in said complexity detecting step, and a second quantization process for adjusting the code amount generated from the block divided in said block-division step without using the information of the complexity detected in said detecting step,
   wherein said control step includes a step of controlling the encoding step according to an output at said remaining amount detection step, where the first quantization process is used for a first block in a frame, the second quantization process is used for a second block in said frame, and the first quantization process and the second quantization process are not used for the same block in a frame, and
   wherein said control step further includes a step of selecting the first quantization process but not the second quantization process when the remaining recording capacity is larger than a predetermined threshold value, and selecting the second quantization process but not the first quantization process when the remaining recording capacity is equal to or less than the predetermined threshold value.

7. An method according to claim 6, wherein one of the first quantization process and the second quantization process is selectively performed for the block according to a detected remaining recording capacity of the recording medium.

* * * * *